United States Patent [19]
Kulkarni et al.

[11] Patent Number: 5,217,649
[45] Date of Patent: Jun. 8, 1993

[54] ELECTRICALLY CONDUCTIVE BLENDS OF INTRINSICALLY CONDUCTIVE POLYMERS AND THERMOPLASTIC POLYMERS CONTAINING SULFONAMIDE PLASTICIZER AND ACIDIC SURFACTANT

[75] Inventors: Vaman G. Kulkarni, Akron, Ohio; Bernhard Wessling, Bargteheide, Fed. Rep. of Germany

[73] Assignee: Americhem, Inc., Cuyahoga Falls, Ohio

[21] Appl. No.: 648,734

[22] Filed: Jan. 31, 1991

[51] Int. Cl.$^5$ ............................................... H01B 1/12
[52] U.S. Cl. ..................................... 252/500; 252/518; 525/185; 525/186; 525/420; 525/437; 525/453; 525/540
[58] Field of Search ...................... 252/500, 512, 518; 525/185, 186, 420, 437, 453, 540

[56] References Cited

U.S. PATENT DOCUMENTS

| | | | |
|---|---|---|---|
| H944 | 8/1991 | Wade, Jr. et al. | 252/500 |
| 4,052,493 | 10/1977 | Etchells | 264/49 |
| 4,061,827 | 12/1977 | Gould | 428/368 |
| 4,129,677 | 12/1978 | Boe | 428/372 |
| 4,604,427 | 8/1986 | Roberts et al. | 252/500 |
| 4,617,228 | 10/1986 | Newman et al. | 428/265 |
| 4,828,756 | 5/1989 | Benton et al. | 252/518 |
| 4,855,361 | 8/1989 | Yaniger et al. | 252/500 |
| 4,929,388 | 5/1990 | Wessling et al. | 252/500 |
| 4,935,164 | 6/1990 | Wessling et al. | 252/500 |
| 4,983,690 | 1/1991 | Cameron et al. | 252/500 |
| 5,034,463 | 7/1991 | Brokken-Zijp et al. | 525/185 |
| 5,130,054 | 7/1992 | Jasne | 252/500 |
| 5,143,650 | 9/1992 | Gerace et al. | 252/511 |

FOREIGN PATENT DOCUMENTS

| | | |
|---|---|---|
| 61-127737 | 5/1987 | Japan . |
| 89/02155 | 3/1989 | PCT Int'l Appl. . |
| 2214511 | 9/1989 | United Kingdom . |

OTHER PUBLICATIONS

Laakso et al., "Conducting Polymer Blends", *Synthetic Metals* 28, 1989, pp. (467–471).
Conductive Textiles 1988.
An Electrically Conductive Plastic Composite Derived from Polypyrrole and Poly (vinyl Chloride) *Journal of Polymer Science* 23, 1985.
Conducting polymer fibre prepared by melt-spinning method from fusible polythiophene derivative *Polymer Comm.* 28, Nov. 1987.
Electrically-Conductive Fibers of Polyaniline Spun From Solutions in Concentrated Sulfuric Acid *Syn Metals*, 26, 1988.
Spectroscopic Studies of Polyaniline in Solution and in Spin-Cast Films *Syn. Metals* 32, 1989.

*Primary Examiner*—Paul Lieberman
*Assistant Examiner*—Bradley A. Swope
*Attorney, Agent, or Firm*—Renner, Kenner, Greive, Bobak, Taylor & Weber

[57] ABSTRACT

A conductive polymeric blend comprises an intrinsically conductive polymer, an insulating thermoplastic material and at least one additive selected from the group consisting of an impact modifier, an ester-free plasticizer and an acidic surfactant. The thermoplastic material comprises a thermoplastic polymer. The conductive polymeric blend has a conductivity of greater than about $10^{-9}$ S/cm. A process for preparing conductive polymeric blends comprises the steps of forming a blend comprising an intrinsically conductive polymer, an insulating thermoplastic material and at least one additive selected from the group consisting of an impact modifier, an ester-free plasticizer and an acidic surfactant. The thermoplastic material comprises a thermoplastic polymer. The conductive polymeric blend has a conductivity of from of greater than yabout $10^{-9}$ S/cm.

9 Claims, 1 Drawing Sheet

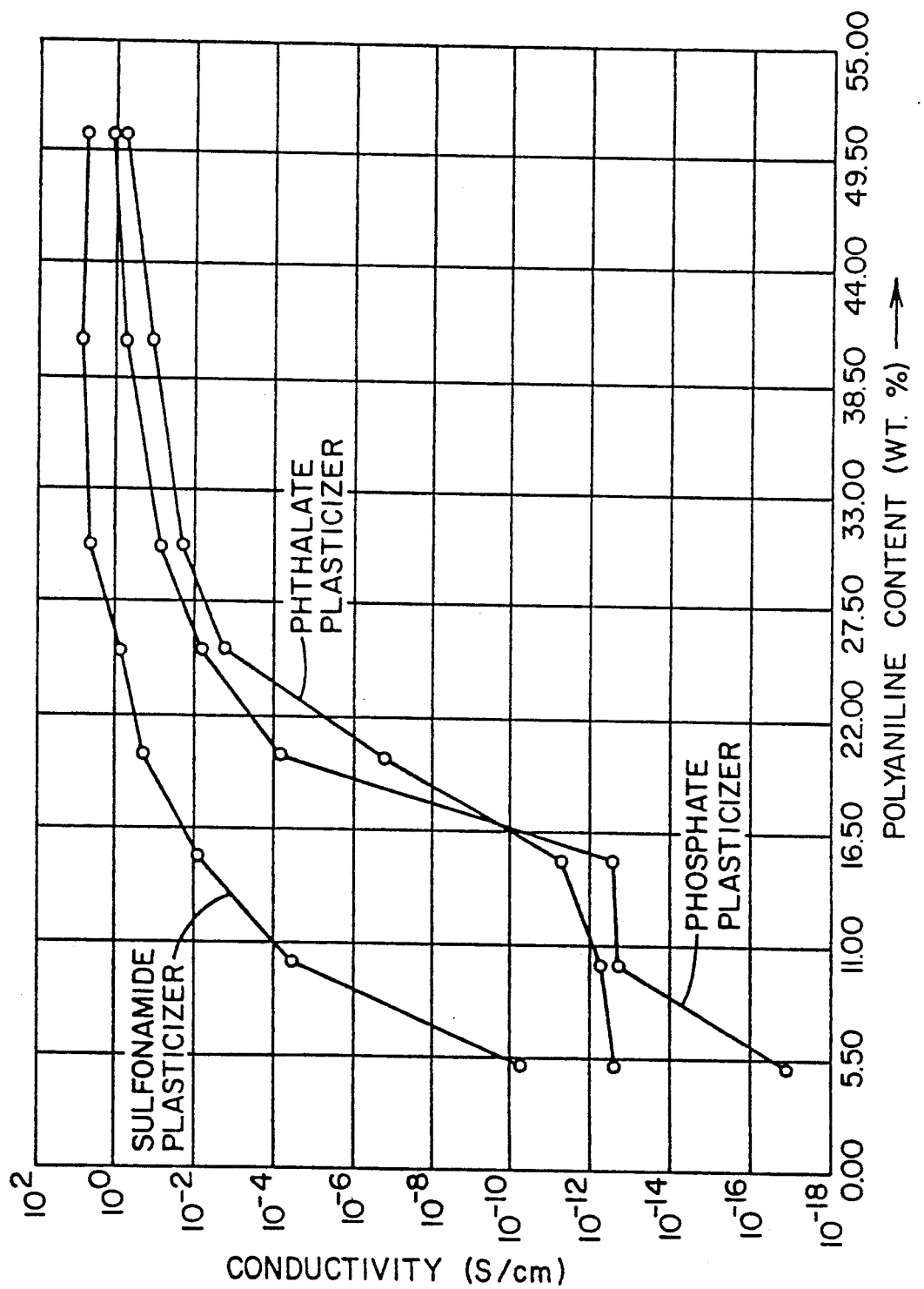

ELECTRICALLY CONDUCTIVE BLENDS OF INTRINSICALLY CONDUCTIVE POLYMERS AND THERMOPLASTIC POLYMERS CONTAINING SULFONAMIDE PLASTICIZER AND ACIDIC SURFACTANT

TECHNICAL FIELD

The present invention generally relates to electrically conductive polymer blends. More particularly, the present invention relates to blends of intrinsically conductive polymers and insulating thermoplastic polymers, especially those requiring the use of a plasticizer. Specifically, the present invention relates to blends of polyaniline and polyvinyl chloride (PVC), including PVC plastisols, chlorinated polyethylene, or other thermoplastic polymer.

BACKGROUND ART

Intrinsically Conductive Polymers (ICP) have been studied since at the latest the 1970's. The term "ICP" refers to organic polymers which have (poly)-conjugated $\pi$-electron systems (e.g. double bonds, aromatic or heteroaromatic rings or triple bonds). Examples of such polymers are polydiacetylene, polyacetylene (PAc), polypyrrole (PPy), polyaniline (PANI), polythiophene (PTh), polyisothionaphthene (PITN), polyheteroarylenvinylene (PArV), in which the heteroarylene group can be the thiophene, furan or pyrrole, poly-p-phenylene (PpP), polyphthalocyanine (PPhc) and the like, and their derivatives (formed for example from monomers substituted with side chains or groups), their copolymers and their physical mixtures. They can exist in various states, each described by different empirical formulae, which can generally be converted essentially reversibly into one or the other by (electro-) chemical reactions such as oxidation, reduction, acid/alkali reaction or complexing. These reactions are also occasionally known as "doping" or "compensation" in the literature, or can be regarded as "charging" and "discharging" in analogy with the electrochemical processes in batteries. At least one of the possible states is a very good conductor of electricity, e.g. has a conductivity of more than 1 S/cm (in pure form), so one can speak of intrinsically conductive polymers. These forms of the ICP are generally recognized as being polyradical cationic or anionic salts.

A good overall review of the intrinsically conductive polymers synthesized to date with a chemical structure suitable for the present objective, is to be found in Synthetic Metals, Issues 17, 18, and 19 (1986), and in Synthetic Metals, Issues 27, 28 and 29 (1988), which are hereby incorporated by reference.

Despite several potentially useful properties exhibited by ICPs, their use as conductive materials has been limited because they do possess some undesirable properties such as, poor processibility (no melting or glass transition temperature), poor solubility in the doped form and environmental instability. To be commercially useful, it is necessary to render these polymers processible by conventional techniques.

Several articles have appeared in the literature describing ways to overcome the processibility problem. These include attempts to synthesize soluble conductive polymers or precursors and/or polymerization of conductive polymers in situ thereby forming conductive polymer composites. Much of the known work on conductive composites using intrinsically conductive polymers such as polyaniline and polypyrrole has generally included electrochemical or chemical coating of the conductive polymer onto a polymeric substrate or electrochemical polymerization onto a swollen polymer using an appropriate solvent.

For example, U.S. Pat. No. 4,617,228 describes a process for making an electrically conductive composite by treating a porous substance such as fiberglass, with the monomer solution, and later treating with an oxidizing agent to produce a conductive composite containing an intrinsically conductive polymer. Similar techniques using a non-porous substrate and/or via solution of the monomer have been illustrated in U.S. Pat. No. 4,604,427 and Japanese Pat. No. JP 61,127,737. These composites have failed to yield highly conductive processible blends, and their preparation has proven to be cumbersome.

Blends of intrinsically conductive polymers with conventional, processible thermoplastics have been suggested to overcome processibility, such as shown in U.S. Pat. No. 4,935,164 (polymer blends), U.S. Pat. No. 4,929,388 (conductive pathways), International Patent Application WO 89/02155 and British Patent No. 2,214,511. These describe post polymerization processes in which the intrinsically conductive polymers are present in a dispersed phase in a thermoplastic matrix, yielding good processibility and high conductivity above a certain critical volume concentration of the dispersed conductive polymer phase. These processes present a generally useful procedure to process conductive polymers into various forms.

As used in the art and as employed herein, the term "polymer blend" is generally understood to mean macroscopically homogeneous mixtures of partly compatible or incompatible organic polymers. They always consist of two or more phases.

Nevertheless there is still a disadvantage resulting from the chemical nature of most of the conductive polymers which include protonic acids as "dopants". They react directly or indirectly with various functional groups present in the polymer matrices which are susceptible to reactions with acids or bases. More specifically, for instance, the basic nature of various homopolymers and copolymers of polyamides (nylons) provides a basic environment which leads to partial dedoping (compensation) of the conductive polymer and/or degradation of the polymer matrix. The same result appears to occur with several aromatic or aliphatic esters present in the various polyester homopolymers or copolymers (regardless of whether they are aromatic or aliphatic) which are used according to the above-mentioned procedures. Polymer matrices such as PVC homopolymers or copolymers, chlorinated polyethylene and similar polymeric matrices are used routinely with plasticizers which have been observed to react with conductive polymers thereby leading to compensation reactions.

With respect to thermoplastic vinyl compounds in general, it is known in the art to employ a plasticizer as a possible major component of a vinyl compound. The selection of the specific plasticizer is based on compatibility with the host polymer, cost and performance. In order for the plasticizer to be compatible, the solubility parameters of the polymer matrix and the plasticizer should match. Typically used plasticizers include phthalate esters such as dioctyl phthalate and dibutyl phthalate, polyesters, azelates, adipates, sebacates, organic phosphates and the like.

The "solubility parameter" is the measure of polarity of a material, and is defined as the square root of cohesive energy density (CED). Most commonly used plasticizers, such as esters have a solubility parameter in the range of 8 to 10 $(cal/cm^3)^{\frac{1}{2}}$.

Ester-type plasticizers are those plasticizers which are formed by the reaction of an acid and an alcohol or compounds that contain the following structural unit:

Typical examples of ester plasticizers include dioctyl phthalate, dibutyl phthalate and the like. Highly polar plasticizers are those with solubility parameters greater than $11(cal/cm^3)^{\frac{1}{2}}$. Typical of this class are sulfonamides, which are generally free of ester linkages.

Furthermore, polymers having acetate, propionate, or other ester groups, are present in various polymers of acrylates which are used in pure form or in polymer blends, as impact modifiers in polyvinyl chloride, polystyrenes and other polymers, have also been observed to react with intrinsically conducting polymers.

Therefore, a need exists for improving the presently available processing techniques of intrinsically conductive polymer blends.

DISCLOSURE OF THE INVENTION

It is therefore, an object of the present invention to provide a processible, conductive polymer blend which includes an intrinsically conductive polymer and an insulating thermoplastic material.

It is another object of the present invention to provide a conductive polymeric blend as above, which possesses mechanical properties comparable to polyvinyl chloride.

It is a further object of the present invention, to provide blends as above, of "doped" polyaniline and polyvinyl chloride, chlorinated polyethylene or other thermoplastic polymer which exhibit high electrical conductivity.

It is still another object of the invention to provide a blend as above, having a dispersion of polyaniline within the thermoplastic matrix containing a plasticizer.

It is an additional object of the invention to provide improved blends of "doped" polyaniline and polyamides (nylons), polyesters or polycarbonates (in the form of homopolymers or copolymers), copolymers of vinyl acetate, and acrylate homopolymers or copolymers.

In general, a conductive polymer blend comprises an intrinsically conductive polymer, an insulating thermoplastic material and at least one additive selected from the group consisting of an impact modifier, an ester-free plasticizer and an acidic surfactant. The insulating thermoplastic material comprises a thermoplastic polymer and the blend has a conductivity of greater than about $10^{-9}$ S/cm.

A process for preparing conductive polymeric blends according to the invention comprises the step of forming a blend. The blend comprises an intrinsically conductive polymer, an insulating thermoplastic material and at least one additive selected from the group consisting of an impact modifier, an ester-free plasticizer and an acidic surfactant. The thermoplastic material comprises a thermoplastic polymer and the conductive polymeric blend has a conductivity of above about $10^{-9}$ S/cm.

These and other objects, together with the advantages over the known compositions and processes shall become apparent from the specification which follows and are accomplished by the invention as hereinafter described and claimed.

BRIEF DESCRIPTION OF THE DRAWING

The drawing FIGURE provides a graphic representation of conductivity test data for conductive blends of the present invention in order to demonstrate the effectiveness thereof.

PREFERRED EMBODIMENT FOR CARRYING OUT THE INVENTION

According to the present invention a highly conductive blend of an intrinsically conductive polymer and an insulating thermoplastic material is achieved despite the high polarity and reactivity of the intrinsically conductive polymer. The electrically conductive blend may be employed to manufacture articles where it is desirable to have electrical conductivities in the range of those possessed by doped polyaniline. For instance, the present invention has a particular application for electromagnetic interference shielding, electrostatic dissipation and the like.

A preferred intrinsically conductive polymer according to the present invention is doped polyaniline. For example, polyaniline may be doped with protonic acids such as hydrochloric acid or an organic sulfonic acid.

The insulating thermoplastic material may be a polyvinyl chloride homopolymer or a polyvinyl chloride copolymer with vinyl acetate; chlorinated polyethylene; polyamide (nylon); polyester; polyurethane; polyvinyl acetate; polyacetate; polyacrylate; and the like, as well as copolymers and mixtures thereof. By "insulating" it is understood to mean non-conductive, having a volume conductivity lower than about $10^{-12}$ S/cm.

The invention preferably makes use of from about 1 to about 50 parts of the intrinsically conductive polymer blended with from about 50 to about 99 parts of the insulating thermoplastic material.

Furthermore, as will be more appreciated from the discussion to follow, the thermoplastic material can comprise 100 percent by weight of a suitable thermoplastic polymer; a blend of a thermoplastic polymer and a plasticizer; a blend of a thermoplastic polymer and an acidic surfactant; or, a blend of a thermoplastic polymer, a plasticizer and an acidic surfactant. The term "thermoplastic material" is thus understood to include appropriate thermoplastic polymers with or without the additional blend additives. Optionally, an impact modifier may be employed as also discussed hereinbelow.

It is preferred that the thermoplastic polymer be plasticized with a highly polar, ester-free plasticizer. Furthermore, it is also desirable for the blend to comprise from 0 (if no plasticizer is employed) to about 66 parts by weight of an ester-free plasticizer per 100 parts by weight of the thermoplastic material. Thus, if the amount of the ester-free plasticizer is varied between the preferred range, there is a corresponding change in the amount of the thermoplastic polymer in the thermoplastic material. Heretofore, studies with conventional plasticizers have not been successful in obtaining a highly conductive blends of polyaniline and polyvinyl chloride, chlorinated polyethylene or other thermoplastic materials. This is attributable to the reaction of polyaniline with conventional esters, resulting in loss of conductivity.

Highly polar plasticizers, such as the sulfonamides are not compatible with polyvinyl chloride. Polyaniline is a highly polar compound. It is an unexpected result that the blends according to the invention and containing sulfonamides could be prepared in a superior quality compared to blends with conventional plasticizers. Preferred highly polar plasticizers include those having a solubility parameter of greater than about 11 $(cal/cm^3)^{\frac{1}{2}}$. Exemplary of the plasticizers which may be employed are n-butyl benzene sulfonamide, n-butyl and n-ethyl toluene sulfonamides and other sulfonamides.

It may also be useful for the blend of the present invention to comprise an acidic surfactant, and preferably from about 0 (if no acidic surfactant is employed) to about 20 percent by weight based upon the weight of the intrinsically conducting polymer. It is also useful to the practice of the present invention if the acidic surfactant is present as a pre-blend with the intrinsically conductive polymer. For purposes of the exemplary useful ranges for the acidic surfactant, it is preferred that even if present in the pre-blend, the amount of the thermoplastic polymer present in the blend is correspondingly varied as the amount of the acidic surfactant is varied. Polyaniline is stable in acidic environments. However, under alkaline conditions, polyaniline loses its conductivity, owing to the dedoping or compensation reaction. The presence of an acidic surfactant, in addition to being a dispersion aid, maintains an environment for polyaniline to remain in the conductive form. Preferred surfactants include those having a pH of less than about 6. For example, useful acidic surfactants include organic phosphate esters such as those of nonionic surfactants of ethylene oxide-adduct type, and an acid anhydride dispersants. A useful acid anhydride surfactant is available from Lubrizol Corporation as OS 65238.

Other surfactants would include those with acid, anhydride or lactone groups, and if employed, the blend can include up to about 1 part of surfactant for every 10 parts of intrinsically conductive polymer.

As will be appreciated by those skilled in the art, the present invention also has applicability to preparing highly conductive blends of polyaniline/nylon, polyaniline/polyesters, and the like.

As will be fully addressed herein below, blends according to the present invention possess conductivities above about $10^{-9}$ S/cm and preferably in the range of $10^{-9}$ to 10 S/cm, and uniform distribution of polyaniline. The amount of polyaniline can be varied to provide the required conductivity. Furthermore, impact modifiers such as chlorinated polyethylenes and the acrylics, stabilizers and other processing aids may be employed, as known in the art.

As noted hereinabove, polymer blends of the present invention can also include an impact modifier. Impact modifiers when employed, are preferably blended with the thermoplastic material and include polymers such as chlorinated polyethylene. It will be appreciated by one skilled in the art, that certain polymers such as chlorinated polyethylene have application both as the thermoplastic polymer constituent of the thermoplastic material, and as an impact modifier. Therefore, when the thermoplastic polymer employed is a useful impact modifier, additional amounts of that polymer will not necessarily need to be added to the thermoplastic material. When an impact modifier is employed, from about 1 to about 99 percent by weight of the impact modifier may be employed with from about 99 to about 1 percent by weight of the thermoplastic polymer.

Other processing aids may include lubricants, such as montan ester wax, long chain alcohols and certain amid waxes, as known in the art.

EXPERIMENTAL

In order to demonstrate the effectiveness of blends according to the present invention, a number of blends were prepared employing conventional and electron donating highly polar plasticizers. The data obtained from these experiments show the highly conductive nature of blends according to the present invention. Conductivity data was collected via the four-point probe method, as is known in the art. The following examples are expressed in parts by weight. Examples 1-3 show the preparation of the insulating thermoplastic material as a blend of a thermoplastic polymer, a plasticizer and chlorinated polyethylene as an impact modifier.

EXAMPLE 1

A polyvinyl chloride compound containing 63 parts of homopolymer polyvinyl chloride, 32 parts of a phthalate plasticizer, 15 parts of an impact modifier, 2 parts of stabilizer and 3 parts of processing aid was prepared by mixing on a 2-roll mill.

EXAMPLE 2

A polyvinyl chloride compound containing 63 parts of homopolymer polyvinyl chloride, 32 parts of a sulfonamide plasticizer, 15 parts of an impact modifier, 2 parts of stabilizer and 3 parts of processing aid was prepared by mixing on a 2-roll mill.

EXAMPLE 3

A polyvinyl chloride compound containing 63 parts of homopolymer polyvinyl chloride, 32 parts of a phosphate plasticizer, 15 parts of an impact modifier, 2 parts of stabilizer and 3 parts of processing aid was prepared by mixing on a 2-roll mill.

EXAMPLE 4

In order to evaluate and demonstrate the change in conductivity as a function of polyaniline concentration (percolation curve) a series of compounds based on Examples 1-3 were prepared by varying the concentration of polyaniline between 50 weight percent and 5 weight percent. The starting composition for each series was 50 parts by weight of polyaniline, 45 parts by weight of polyvinyl chloride compound and 5 parts of an organic phosphate ester surfactant.

The conductivity for each was determined and the drawing figure shows a plot of the data. The results clearly indicate the highest conductivity for the polyaniline/polyvinyl chloride compound system containing the sulfonamide type plasticizer.

EXAMPLE 5

A composition containing 25 parts by weight of polyaniline and 75 parts of the thermoplastic material of Example 1 was prepared and showed a bulk conductivity of $5.6 \times 10^{-8}$ S/cm.

EXAMPLE 6

A composition containing 25 parts by weight of polyaniline and 75 parts of the thermoplastic material of Example 2 was prepared and showed a bulk conductivity of $4.0 \times 10^{-2}$ S/cm.

EXAMPLE 7

A composition containing 25 parts by weight of polyaniline, 5 parts by weight of an organic phosphate type surfactant and 70 parts by weight of the thermoplastic material of Example 1 was prepared and showed a conductivity of $3.8 \times 10^{-4}$ S/cm.

EXAMPLE 8

A composition containing 25 parts by weight of polyaniline, 5 parts by weight of an organic phosphate type surfactant and 70 parts by weight of the thermoplastic material Example 2 was prepared and showed a conductivity of 0.35 S/cm.

EXAMPLE 9

A composition containing 25 parts by weight of polyaniline and 52 parts by weight of chlorinated polyethylene, 15 parts by weight of sulfonamide plasticizer and 5 parts by weight of an organic phosphate ester and 2 parts by weight of stabilizer and 1 part by weight of processing aid was prepared by mixing on a two-roll mill and was found to have a conductivity of 0.1 S/cm.

EXAMPLE 10

A composition containing 39.0 parts of a nylon copolymer, 1.0 parts of montan ester wax, and 5 parts of a sulfonamide plasticizer, 5 parts of organic phosphate ester surfactant and 50 parts of polyaniline (PANI) was prepared yielding a 50 percent polyaniline blend. This blend was subsequently diluted with a nylon copolymer to give varying concentrations of polyaniline. The weight concentrations and the respective conductivities are listed in Table I hereinbelow.

TABLE I

| Weight Concentration/Conductivity | |
|---|---|
| PANI Weight % | Conductivity S/cm |
| 5 | $2.7 \times 10^{-7}$ |
| 10 | $2.9 \times 10^{-3}$ |
| 15 | 0.13 |
| 20 | 0.32 |
| 25 | 0.98 |
| 30 | 1.85 |
| 40 | 3.72 |
| 50 | 5.03 |

EXAMPLE 11

A composition containing 21.75 parts of a polyester copolymer, 1.25 parts of a first lubricant of montan ester wax, 0.4 parts of a second lubricant comprising a long chain alcohol, 0.1 parts of stabilizer and 2.5 parts of a mixture consisting of a sulfonamide plasticizer, organic phosphate ester surfactant and surfactant of the ethylene oxide nonyl phenol condensate type and 17.4 parts of polyaniline was prepared yielding a 40 percent polyaniline blend. This blend was subsequently diluted with additional amounts of the polyester copolymer to give varying concentrations of polyaniline. The weight concentrations and the conductivities are listed in Table II hereinbelow.

TABLE II

| Weight Concentration/Conductivity | |
|---|---|
| PANI Weight % | Conductivity S/cm |
| 7 | $2 \times 10^{-13}$ |
| 8 | $4 \times 10^{-8}$ |
| 9 | $5 \times 10^{-8}$ |
| 10 | $1 \times 10^{-6}$ |
| 11 | $1 \times 10^{-4}$ |
| 12 | $4 \times 10^{-4}$ |
| 13 | $2 \times 10^{-3}$ |
| 15 | $1 \times 10^{-2}$ |
| 20 | 0.24 |
| 30 | 1.86 |
| 40 | 3.13 |

EXAMPLE 12

A composition containing 22.5 parts of a polycarbonate, 4.0 parts of a first lubricant of montan ester wax, 0.5 parts of a second lubricant comprising a long chain alcohol, 0.2 parts of stabilizer and 2.5 parts of a mixture consisting of sulfonamide plasticizer, organic phosphate ester surfactant and surfactant of the ethylene oxide nonyl phenol condensate type and 23.5 parts of polyaniline was prepared yielding a 44 percent polyaniline blend. This blend was subsequently diluted with polycarbonate to give varying concentrations of polyaniline. The weight concentrations and the conductivities are listed in Table II hereinbelow.

TABLE III

| Weight Concentration/Conductivity | |
|---|---|
| PANI Weight % | Conductivity S/cm |
| 12.2 | $2 \times 10^{-9}$ |
| 13.4 | $1 \times 10^{-9}$ |
| 16.7 | $1 \times 10^{-7}$ |
| 23.4 | $2 \times 10^{-4}$ |
| 28.4 | $9 \times 10^{-4}$ |
| 33.5 | $5.8 \times 10^{-3}$ |
| 38.6 | $8.2 \times 10^{-3}$ |
| 44 | 0.21 |

Based upon the foregoing exemplification, it can be seen that the present invention provides highly electrically conductive blends of polyaniline and polyvinyl chloride and/or chlorinated polyethylene as well as a process for their preparation. It is to be understood that the examples reported herein have been provided to present results obtainable by practice of the disclosed invention. Inasmuch as a wide variety of thermoplastic polymers such as polyvinyl chlorides, chlorinated polyethylene, nylons, polyesters, polyacetates, polyacrylates, and the like, as well as plasticizers, surfactants, impact modifiers and other components have been disclosed for use in conjunction with polyaniline to form blends according to the invention, this invention is not limited to the specific examples provided herein. Furthermore, the process for preparing these conductive blends is believed to be operable with components, concentrations and conditions, other than those which have been exemplified herein. Thus, it should be evident that the determination of particular components, concentrations and other conditions, can be made without departure from the spirit of the invention herein disclosed and described, and the scope of the invention shall include all modifications and variations that fall within the scope of the attached claims.

We claim:

1. A processible, conductive polymer blend comprising:
   from about 1 to about 50 parts by weight of an intrinsically conductive polymer; and,
   from about 99 to about 50 parts by weight of an insulating thermoplastic material;
   wherein said thermoplastic material comprises from about 100 to about 50 percent by weight of a thermoplastic polymer selected from the group consisting of polyvinyl chloride, copolymers of polyvinyl chloride with vinyl acetate, chlorinated polyethylene, polyamides, polyesters, polyacetates, polyvinyl acetates, polyacrylates, polyurethanes, and copolymers and mixtures thereof; and
   wherein said thermoplastic material also comprises from about 1 to about 40 percent by weight of a sulfonamide plasticizer, and from about 1 to about 10 percent by weight of an acidic surfactant;
   the blend having a conductivity of above about $10^{-2}$ S/cm.

2. A processible, conductive polymer blend comprising:
   from about 1 to about 50 parts by weight of an intrinsically conductive polymer; and,
   from about 99 to about 50 parts by weight of an insulating thermoplastic material;
   wherein said thermoplastic material comprises from about 99 to about 1 percent by weight of polyvinyl chloride; and,
   wherein said thermoplastic material also comprises from about 1 to about 99 percent by weight of chlorinated polyethylene, from about 1 to about 40 percent by weight of a sulfonamide plasticizer with an attendant decrease in the amount of said thermoplastic polymer in said thermoplastic material and from about 1 to about 10 percent by weight of an acidic surfactant with an attendant decrease in the amount of said thermoplastic polymer in said thermoplastic material;
   the blend having a conductivity of above about $10^{-2}$ S/cm.

3. A conductive polymeric blend as in claim 2, wherein said intrinsically conductive polymer is selected from the group consisting of doped polyanilines.

4. A conductive polymeric blend as in claim 3, wherein said doped polyaniline has been doped with hydrochloric acid or organic sulfonic acids.

5. A conductive polymeric blend as in claim 2, wherein said sulfonamide plasticizer is selected from the group consisting of N-butyl benzene sulfonamide, N-butyl toluene sulfonamide and N-ethyl toluene sulfonamide.

6. A conductive polymeric blend as in claim 2, wherein said plasticizer has a solubility parameter of greater than about 11 $(cal/cm^3)^{1/2}$.

7. A conductive polymeric blend as in claim 2, wherein said acidic surfactant has a pH of less than about 6.

8. A conductive polymeric blend as in claim 7, wherein said acidic surfactant is selected from the group consisting of acid anhydrides, lactones and organic phosphate esters.

9. A conductive polymeric blend as in claim 8, wherein said organic phosphate ester is a nonionic ethylene oxide adduct.

* * * * *